US008810684B2

(12) United States Patent
Chang (10) Patent No.: US 8,810,684 B2
(45) Date of Patent: Aug. 19, 2014

(54) TAGGING IMAGES IN A MOBILE COMMUNICATIONS DEVICE USING A CONTACTS LIST

(75) Inventor: E-Cheng Chang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 12/757,653

(22) Filed: Apr. 9, 2010

(65) Prior Publication Data
US 2011/0249144 A1    Oct. 13, 2011

(51) Int. Cl.
*H04N 5/76*  (2006.01)
*H04W 4/00*  (2009.01)
*G06K 9/46*  (2006.01)
*G06F 17/30* (2006.01)
*G11B 27/28* (2006.01)
*H04N 5/77*  (2006.01)
*G11B 27/10* (2006.01)
*H04N 9/82*  (2006.01)

(52) U.S. Cl.
CPC ........ *G06F 17/30265* (2013.01); *H04N 9/8205* (2013.01); *H04N 9/8233* (2013.01); *G11B 27/28* (2013.01); *G06F 17/30259* (2013.01); *H04N 5/772* (2013.01); *G11B 27/105* (2013.01)
USPC ......... 348/231.1; 455/466; 382/195; 707/705

(58) Field of Classification Search
None
See application file for complete search history.

(56) References Cited

U.S. PATENT DOCUMENTS

| 6,185,602 | B1* | 2/2001 | Bayrakeri | 709/204 |
| 2008/0146274 | A1 | 6/2008 | Cho | |
| 2008/0220750 | A1 | 9/2008 | Steinberg et al. | |
| 2008/0240702 | A1 | 10/2008 | Wassingbo et al. | |
| 2008/0279425 | A1* | 11/2008 | Tang | 382/118 |
| 2009/0122198 | A1 | 5/2009 | Thorn | |
| 2009/0324022 | A1* | 12/2009 | Sangberg et al. | 382/118 |
| 2011/0013810 | A1* | 1/2011 | Engstrom et al. | 382/118 |
| 2011/0044512 | A1* | 2/2011 | Bambha et al. | 382/118 |
| 2011/0078097 | A1* | 3/2011 | Thornton et al. | 706/12 |

* cited by examiner

*Primary Examiner* — Luong T Nguyen
(74) *Attorney, Agent, or Firm* — Fish & Richardson P.C.

(57) ABSTRACT

An improved image tagging system that tags images in a mobile handheld communications device, based on the user's contacts list stored therein. The image tagging system compares a face in a given picture (that the user has just taken using the built-in camera) to faces in the user's contacts list images. A matching contact is found in the contacts list. The picture is then tagged with information from the matching contact. The picture is tagged by inserting identification information into a header of the picture.

23 Claims, 9 Drawing Sheets

| | |
|---|---|
| File name | : img_1771.jpg |
| File size | : 32764 Bytes |
| MIME type | : image/jpeg |
| Image size | : 480 x 360 |
| Camera make | : Canon |
| Camera model | : Canon PowerShot S40 |
| Image timestamp | : 2003:12:14 12:01:44 |
| Image number | : 117-1771 |
| Exposure time | : 1/500 s |
| Aperture | : F4.9 |
| Exposure bias | : 0 EV |
| Flash | : No, auto |
| Flash bias | : 0 EV |
| Focal length | : 21.3 mm |
| Subject distance | : 782 |
| ISO speed | : 100 |
| Exposure mode | : Program (P) |
| Metering mode | : Center weighted average |
| Macro mode | : Off |
| Image quality | : Superfine |
| Exif Resolution | : 2272 x 1704 |
| White balance | : Auto |
| Thumbnail | : image/jpeg, 5448 Bytes |
| Copyright | : |
| UserComment | : Joe Dunn |
| Exif comment | : |

TAGGING IMAGES IN A MOBILE COMMUNICATIONS DEVICE USING A CONTACTS LIST

BACKGROUND

An embodiment of the invention generally relates to an image name tagging application that tags an image based on a contacts list stored in a portable handheld electronic communications device. Other embodiments are also described.

Modern portable electronic communications devices such as smart phones often include a digital camera. Incorporation of cameras into portable electronic devices has eased the process of capturing digital images of friends and families and accordingly has resulted in large expansion in the amount of images a user takes. In an attempt to organize this abundance of images, users have begun to classify each image based on the persons depicted in the image. Software is now available that can detect and analyze a face in the image, prompt the user to give a name for the face, and then digitally tag the image with the name.

SUMMARY

Organizing images by tagging identification information of individuals into each image is useful; however, this method of managing digital images suffers from implementation drawbacks in the case of camera-enabled portable handheld communications devices such as smart phones and cellular phones. In particular, the effort required to manually tag a large set of images may render the task impractical. Further, although software on desktop and notebook computers may be capable of providing some level of automatic tagging of digital images, these applications require images to be off-loaded from the handheld device onto the desktop or notebook computer prior to being tagged. Additionally, these applications require substantial user interaction to properly tag each image.

An embodiment of the invention is directed to an improved image tagging system that tags images in a mobile handheld communications device, based on the user's contacts list stored therein. In one embodiment, the image tagging system compares a face in a given picture (that the user has just taken using the built-in camera) to faces in the user's contacts list images. A matching contact is located in the contacts list. The picture is then tagged with information from the matching contact. In one embodiment, the picture is tagged by inserting identification information into a header of the picture.

In a further embodiment, the accuracy of the face identification may be enhanced when the device can also access a second database of images that have been mapped to individuals (who are likely to also appear in the user's contact list). The second database may be more complete than the contacts list data structure, in that it can have more instances of an individual's face.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
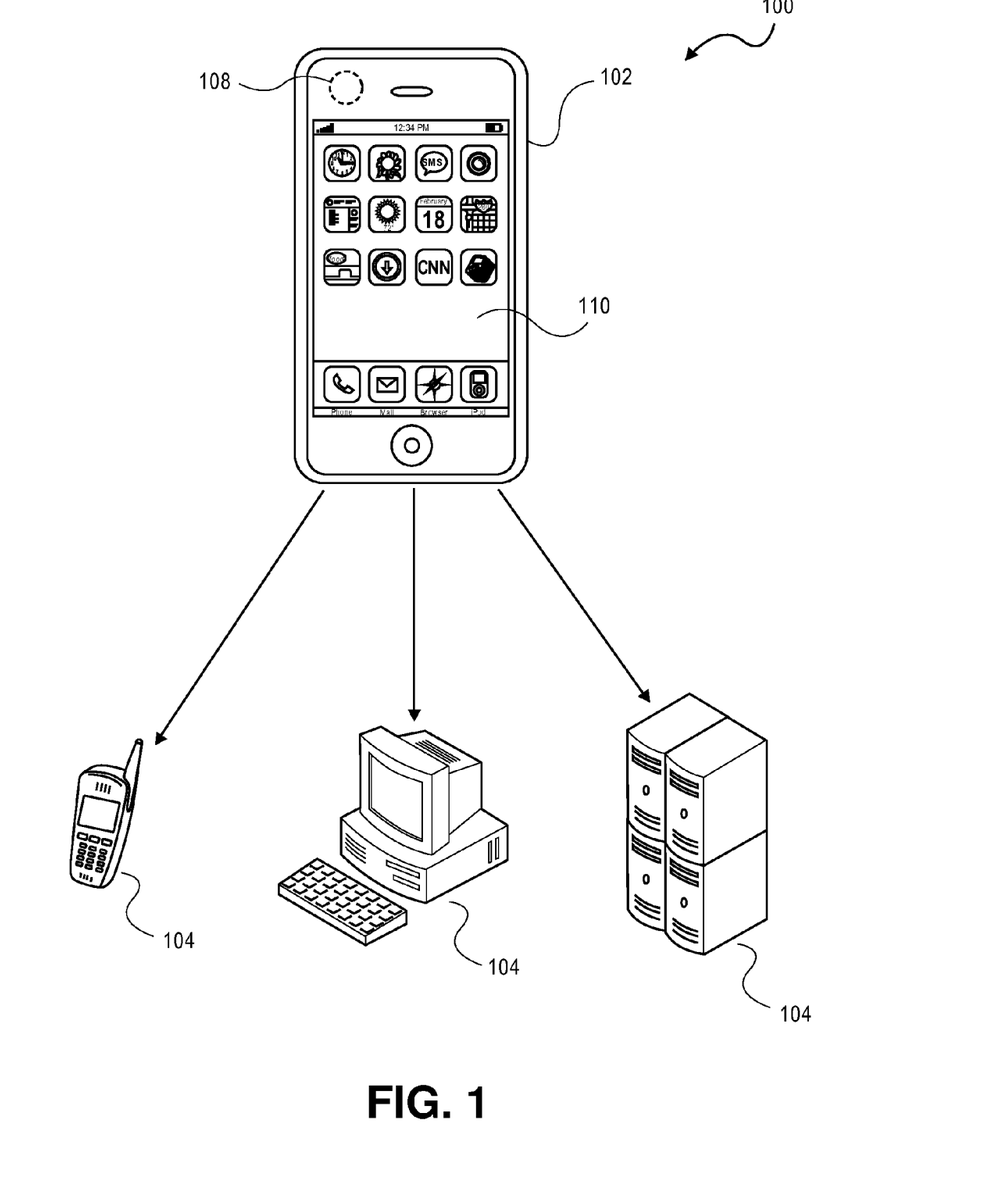
FIG. 1 is a diagram showing an image sharing system, in accordance with an embodiment of the invention.

FIG. 1 illustrates an image sharing system 100 in which an embodiment of the invention operates. The image sharing system 100 includes a mobile communications device 102 and one or more recipient terminals 104.

The device 102 includes an integrated camera 108 which is capable of capturing still images and/or video. In one embodiment, the device 102 includes a touch screen 110 which permits a user of the device 102 to input commands to control camera functions (e.g. enable automatic picture tagging; shutter release; and picture transfer). The device 102 may be a cellular phone or smart phone (mobile, handheld, multi-function communications device) that can access a network for communications with a remote terminal (referred to here simply as "mobile device"). In one embodiment, the mobile device 102 includes a camera application program which is capable of automatically tagging an image (or a picture) which has just been taken, with one or more matching names of a contacts list stored in the mobile device 102. The tagged image may then be stored in the mobile device and then transmitted to one or more recipient terminals 104 (external devices). This may be done via a network which may be a cellular telephone network or a wireless local area network that provides access to the Internet (e.g. for email messaging, voice over IP telephony, or MMS messaging). Alternatively, the transfer may be over a peer-to-peer, direct connection (e.g. a wireless ad-hoc network mode of operation, a wired computer peripheral serial bus link, e.g. Universal Serial Bus, USB connection).

The recipient terminals 104 may be any device or system capable of receiving images from the mobile device 102. For example, a recipient terminal 104 may be another mobile device, a personal digital assistant, a desktop or laptop computer, an entertainment system, or an internet-based image hosting service (e.g. Picasa™, Flikr®, Facebook®, and MySpace™). In one embodiment, the recipient terminals 104 are capable of communicating over a telephone network and receiving Multimedia Messaging Service (MMS) messages that can contain one or more tagged images.

Figure 2:
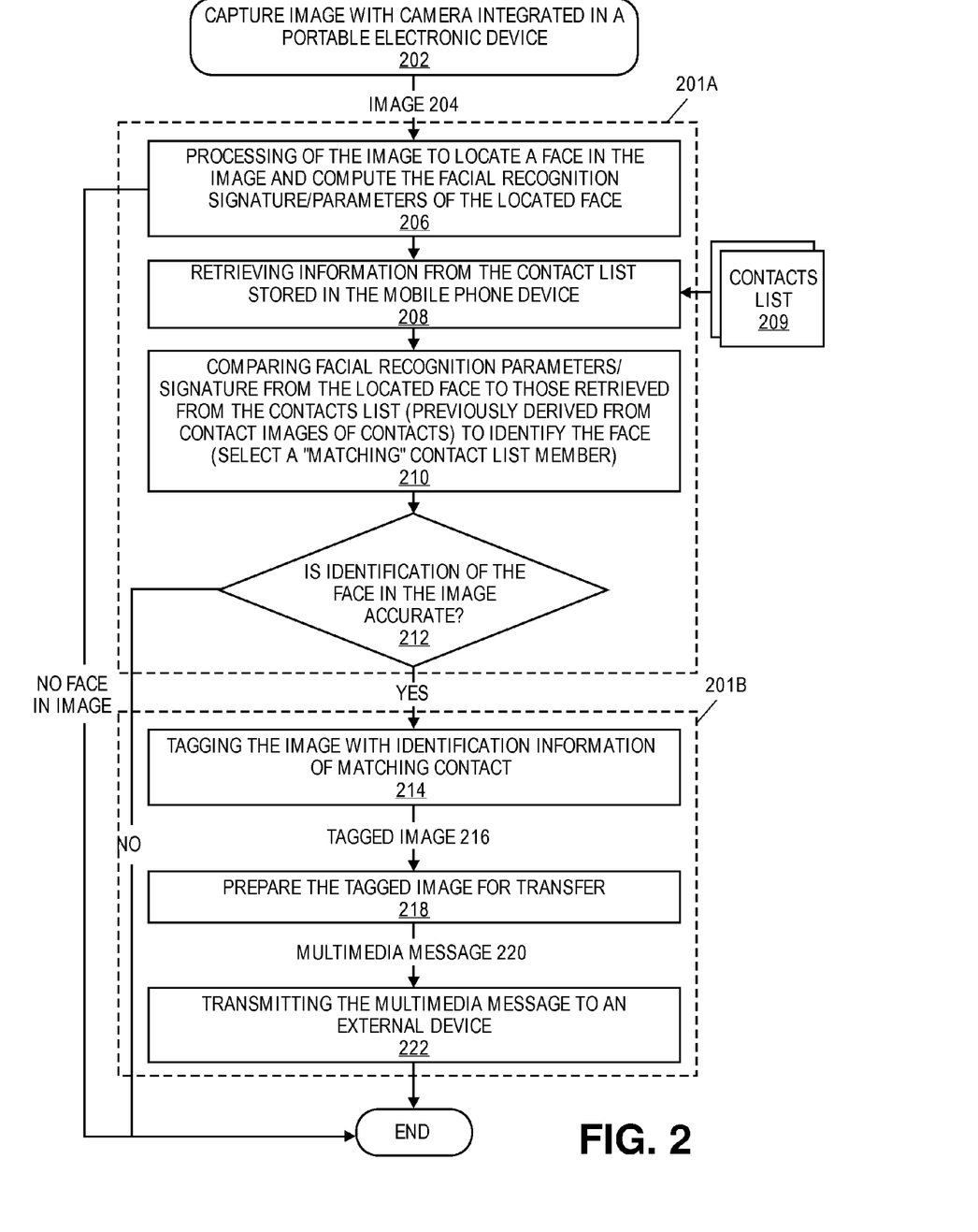
FIG. 2 is a data flow or algorithm of a process or application for tagging an image in a mobile device.

For a more detailed look at the operation of the mobile device 102, FIG. 2 illustrates a flowchart or algorithm for a tagging application 200 that has configured or programmed one or more microelectronic data processing components and their associated data storage components of the mobile device 102 (e.g. an applications processor and integrated circuit memory; a digital signal processor; a microcontroller) to perform the recited operations. The following references to the "tagging application" are interchangeable with "tagging process", which is the process that is performed by the mobile device 102 when running the tagging application.

The tagging application 200 may have two phases of operation: an identification phase 201a and an image tagging phase 201b. In the identification phase 201a, the tagging application 200 identifies a face in an image by associating the face with a matching contact in a contact list stored in the portable electronic device 102. In the image tagging phase 201b, the tagging application 200 tags the image with identification information of the matching contact (that also may have been verified) and may prepare the image for transmission from the mobile device 102 to one or more recipient terminals 104. Each of these phases 201a, 201b will be discussed in further detail below through the use of example implementations.

Identification Phase

The tagging application 200 may begin by first performing the operations of the identification phase 201a. In one embodiment, the identification phase 201a of the tagging application 200 automatically commences operation in response to a user command to capture an image 204 using the integrated camera 108 (also referred to as shutter release) at operation 202. As used herein, "capturing an image" and derivatives are understood as a process of conversion of light waves that are sensed by an electronic imager, such as a charge-coupled device (CCD) or a complementary metal-oxide-semiconductor (CMOS) chip, into a digital image comprised of pixels. The image 204 may be stored in either transitory or persistent memory in a digital image file format (e.g. Joint Photographic Experts Group (JPEG), Exchangeable image file format (Exif), Tagged Image File Format (TIFF), Portable Network Graphics (PNG), RAW image file format, Graphics Interchange Format (GIF), BMP file format, Netpbm file format). In another embodiment, the identification phase 201a commences operation after being manually invoked by a user such that the tagging application 200 operates on a previously captured image 204 stored in the mobile device 102.

Figure 3:
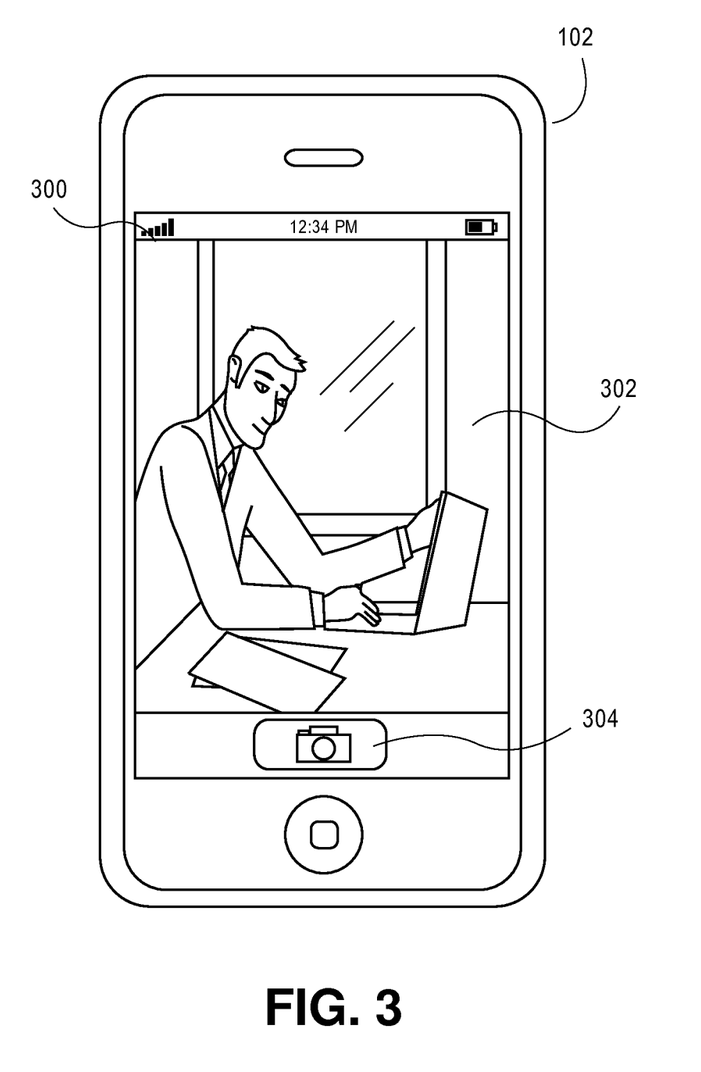
FIG. 3 is a screenshot of a camera interface window in which a user may enter a command to capture an image, in accordance with an embodiment of the invention.

FIG. 3 shows an example camera interface 300 in which a user can preview a scene before the camera 108 and may enter a command to capture an image of the scene (and consequently commence operation of the identification phase 201a of the tagging application 200). In this particular example of the camera interface 300, the user is presented with an optical representation 302 of the image 204 to be captured, using a touch screen 110 of the portable electronic device 102. The user inputs a command to capture the image 204 by selecting a virtual button 304 on the touch screen 110. After the user has activated the virtual button 304, the integrated camera 108 responds by capturing the image 204 according to the optical representation 302 and stores the image 204 in the mobile device 102.

Following the capture or receipt of an image by the mobile device 102, operation 206 of the identification phase 201a may automatically commence processing of the image 204. Operation 206 scans the image to determine an area or areas of the image 204 that contain a face. A face as used herein refers to the central sense organ of a human or animal which typically is comprised of hair, forehead, eyebrows, eyes, nose, ears, cheeks, mouth, lips, philtrum, teeth, skin, and chin. In one embodiment, operation 206 determines only the areas of the image 204 that contain human faces. In another embodiment, operation 206 determines the areas of the image 204 that contain a face of a human or a face of an animal (e.g. dog, cat, and monkey).

If the operation 206 cannot find a face in the image 204, the tagging application 200 may terminate without tagging the image 204 and optionally alert the user that it failed to find a face (e.g. by showing a popup icon on the touchscreen). Conversely, if operation 206 does find a face in the image 204, the operation 206 determines the location or area of the image 204 occupied by a face. The location of a face in the image 204 may be represented as a single point (i.e. Cartesian coordinate) which represents the center location of a face in the image 204, a single point together with a set of distance values which represent the dimensions of a geometrical shape which circumscribes the area of the image 204 occupied by a face relative to the single point, or a set of points in the image 204 which represent the parameters of a geometrical shape which circumscribes the area of the image 204 occupied by a face.

Figure 4:
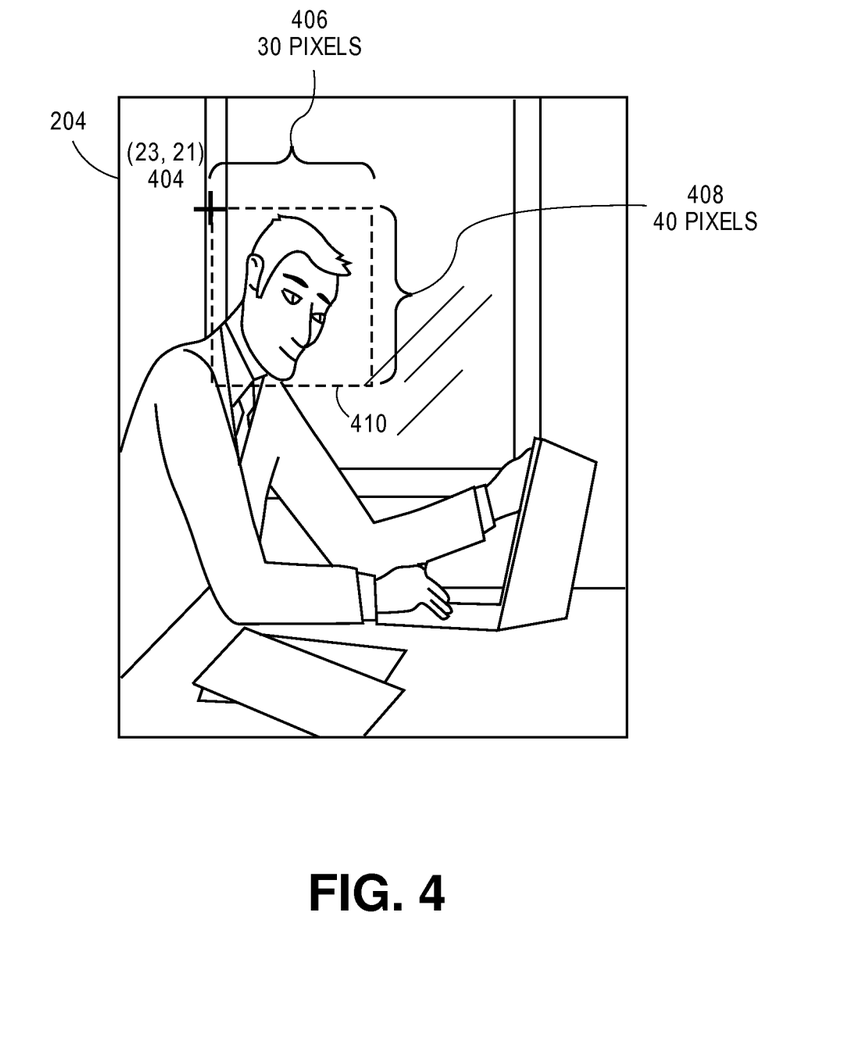
FIG. 4 show an example image in which a face has been detected and located, in accordance with an embodiment of the invention.

FIG. 4 illustrates an example image 204 that may be captured by the device 102 and processed by the tagging application 200. The image 204 includes a face 402 and a torso of a human located in an office environment. Accordingly, operation 206 proceeds to determine the location of the face 402 in the image 204. An example representation for determining the location of the face 402 in the image 204 according to one embodiment of operation 206 is shown in FIG. 4. A reference location 404 proximate to the face 402 is selected along with distances 406 and 408. The reference location 404 represents a corner of a rectangle 410 with width and height corresponding to distances 406 and 408, respectively. In this example, the reference location 404 is defined by Cartesian Coordinates (23, 21) and the distances 406 and 408 are 30 pixels and 40 pixels, respectively. The area of the image 204 circumscribed by the rectangle 410 corresponds to an area of the image 204 containing the face 402. Accordingly, the reference location 404 and distances 406 and 408 collectively represent the location of the face 402 in the image 204. As described above, the location of the face 402 in the image 204 may alternatively be defined using other geometric shapes or a set of points.

In instances in which the image 204 contains more than one face, operation 206 identifies the location of each face in the image 204. Each face is thereafter processed by the tagging application 200 successively. In one embodiment, a user of the portable electronic device 102 may choose a face to process first by selecting the face using an input device integrated or coupled to the portable electronic device (e.g. touch screen 110). In another embodiment, operation 206 randomly selects an order for processing the faces in the image 204.

Returning to the flowchart of FIG. 2, after operation 206 has determined the location of a face in the image 204, operation 208 of the identification phase 201a accesses a contacts list 209 which is stored in the portable electronic device 102. The contacts list 209 is a collection of information that identifies or describes associates, acquaintances, friends, family, etc. of a user of the mobile device 102. Each entry in the contacts list 209 corresponds to an individual contact and is associated with stored, identification information of the contact. The stored identification information may include a legal name, a contact image, a phone number, a home address, an email address, a facial signature and an alias. This information, including the contact image, may have been manually entered by the user. For instance, the contact image may have been a picture (previously taken using the built-in camera) which the user manually associated with the individual contact using a camera application running in the mobile device. The contacts list 209 may be stored as a set of digital files in a memory module of the device 102. In one embodiment, the contacts list 209 is stored as an Extensible Markup Language (XML) file with associated image files representing contact images.

Figure 5:
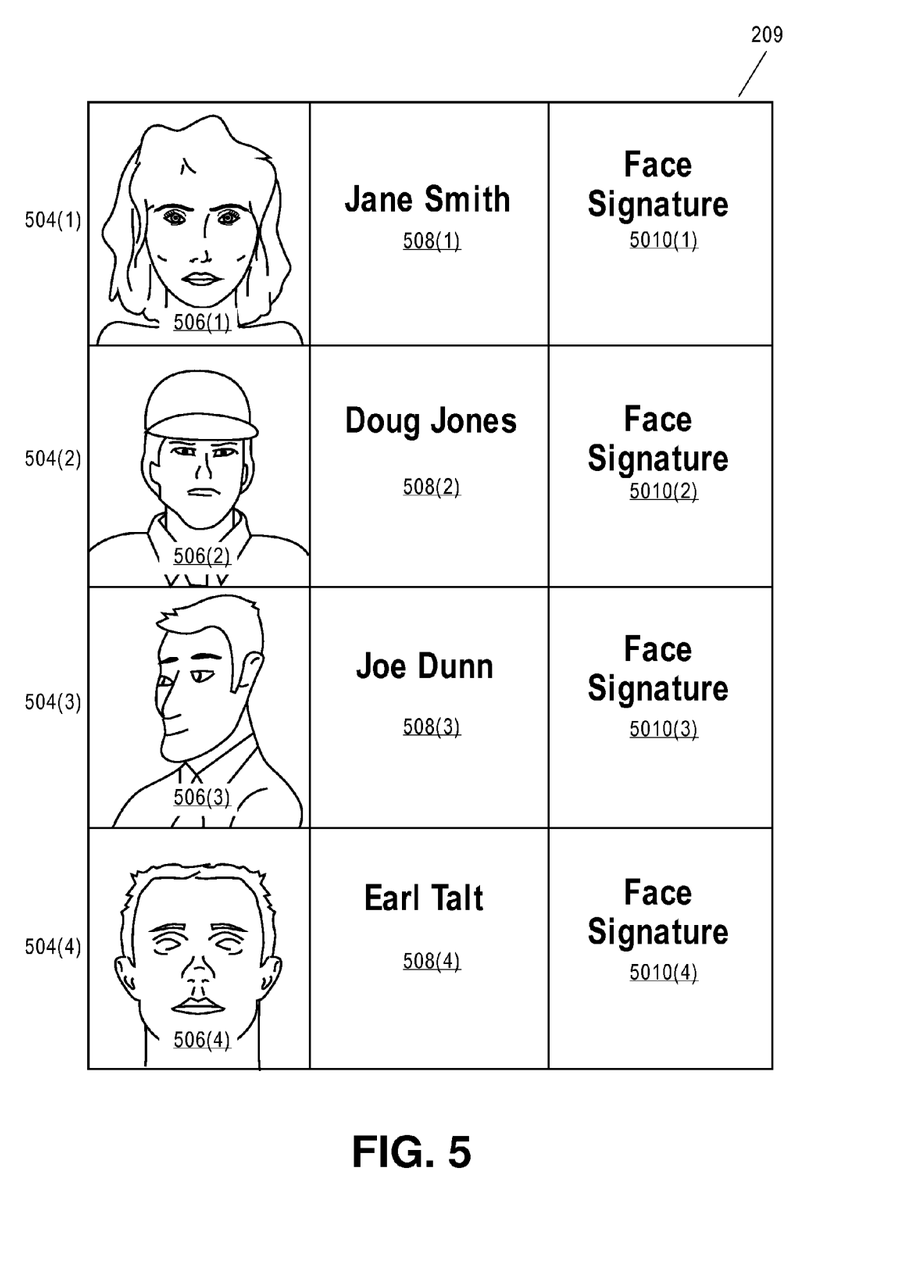
FIG. 5 is an example contacts list stored in a mobile device, in accordance with an embodiment of the invention.

FIG. 5 shows an example contacts list 209 stored on the portable electronic device 102. The contacts list 209 includes a set of contacts 504 associated with a user of the mobile device 102. Each contact 504 in the contacts list 209 includes a set of attributes which comprise identification information of the contact. In the example contacts list 209 of FIG. 5, each contact 504 includes a contact image 506 and a contact name 508, and a facial recognition signature 510. The contact image 506, the contact name 508, and the contact facial recognition signature 510 collectively represent the identification information in the example contacts list 209 of FIG. 5.

Returning again to the flowchart of FIG. 2, after the contacts list 209 has been retrieved, operation 210 of the identification phase 201a determines if the face in the image 204 identified at operation 206 corresponds to or matches with any of the contacts in the contacts list 209. In one embodiment, the face is compared to contact images stored along with the contacts (e.g. contact images 506 of FIG. 5) to determine if the identified face is that of any of the contacts in the contacts list 209.

Operation 210 is passed the contacts list 209, and either the image 204 along with the location of the face in the image 204 determined at operation 206 or alternatively a cropped version of the image 204 which includes only the portion of the image 204 that includes the face. In other embodiments (described further below), operation 210 is passed previously determined or computed, face recognition parameters or face signatures, for each of the contacts in the contacts list 209, and parameters or signatures for the face in the image 204.

In one embodiment, matching of the face in the image 204 to contact images is performed using one or more facial recognition algorithms running in the mobile device 102. For example, facial features of the face are compared against corresponding facial features of faces in each contact image to locate similarities. If a contact image and the face in the image 204 share a requisite number of facial feature similarities, operation 210 concludes a matching contact has been found. Alternatively, if the face in the image 204 does not share a requisite number of similarities with any of the contact images in the contacts list 209, operation 210 concludes a matching contact cannot be found and returns this result to the user and subsequently terminates the tagging application 200 or commences processing another face in the image 204 as appropriate.

The facial recognition algorithms used by operation 210 may include a traditional facial recognition algorithm, which analyzes the relative position, size, and/or shape of facial features such as eyes, a nose, cheekbones, and/or a jaw, a three-dimensional facial recognition algorithm, which identifies distinctive features on the surface of a face, such as the contour of the eye sockets, nose, and chin, and a skin texture algorithm which analyzes unique lines, patterns, and spots apparent on the skin of a face. As described above, in some embodiments, combinations of these algorithms may be used to determine a matching contact.

In one embodiment, facial recognition signatures may have been previously computed or generated for each of the contacts in the contacts list and stored in the mobile device 102 along with the contacts, i.e. as part of the contacts list data structure. The facial recognition signatures represent key facial attributes associated with a contact that are used by face recognition algorithms to identify and distinguish faces in an image. For example, a facial recognition signature may include the distance between eyes in a contact image, the location of cheek bones in a contact image, abnormal features of a face in a contact image, etc. The facial recognition signatures may be generated a single time and thereafter may be re-used repeatedly by the tagging application to match a contact to a face in an image. In that case, the tagging process is faster since it is not necessary to analyze a contact image to determine the facial signature each time a new image is to be tagged.

Based on the example contacts list 502 shown in FIG. 5 and the example face 402 shown in FIG. 4, operation 210 of the identification phase 201a will likely conclude that contact 504(3) is a matching contact for the face 402, because the face 402 shares many facial feature similarities with the face in the contact image 506(3). In a further embodiment, the accuracy of the face identification may be enhanced when the system can also access a second database of images that have been mapped to individuals (who are likely to also appear in the user's contact list). The second database may be more complete than the contacts list data structure, in that it can have more instances of an individual's face. Thus, in operation 210, a "second opinion" on the identity of a given face in the image 204 is computed, using the second database. The second database of images may be one that is maintained and associated with a more complex or dedicated high performance photography application that has been licensed for use by the user in particular, e.g., an instance of the iPhoto client application by Apple Inc., the Picassa Web-based picture album application, or the Facebook social networking Web site. The second database may be imported from or simply accessed via a wired or wireless data connection with another device, such as a desktop computer of the user or a server over the Internet. By using multiple sets or databases of images in this manner, the accuracy of the face detection algorithms performed in operation 210 to identify the face in the image 204 is enhanced.

After operation 210 has determined a matching contact for a face in the image 204, operation 212 may verify the accuracy of the matching contact by requesting input from a user of the mobile device 102. The user may manually confirm the accuracy or inaccuracy of the matching contact using an input device integrated or coupled to the mobile device 102. In one embodiment, operation 212 presents identification information corresponding to the matching contact (taken from the contacts list 502) and the image 204 to the user through the touch screen 110 of the mobile device 102.

In one embodiment, if the user agrees that the face in the image 204 has been properly identified by operation 210, the tagging application 200 proceeds to the image tagging phase 201b. However, if at operation 212 the user disagrees with the identification made at operation 210, the tagging application 200 terminates without proceeding to the tagging phase 201b or commences processing another face in the image 204. In another embodiment, if at operation 212 the user disagrees with the identification made at operation 210, the user is then prompted to enter correct identification information for the face. The correct identification information may be entered by the user through the use of an input device integrated or coupled to the mobile device 102 such as a virtual keyboard displayed on the touch screen 110. In this embodiment, the tagging application 200 then proceeds to tag the image 104 with the user-entered (correct) identification information.

Figure 6:
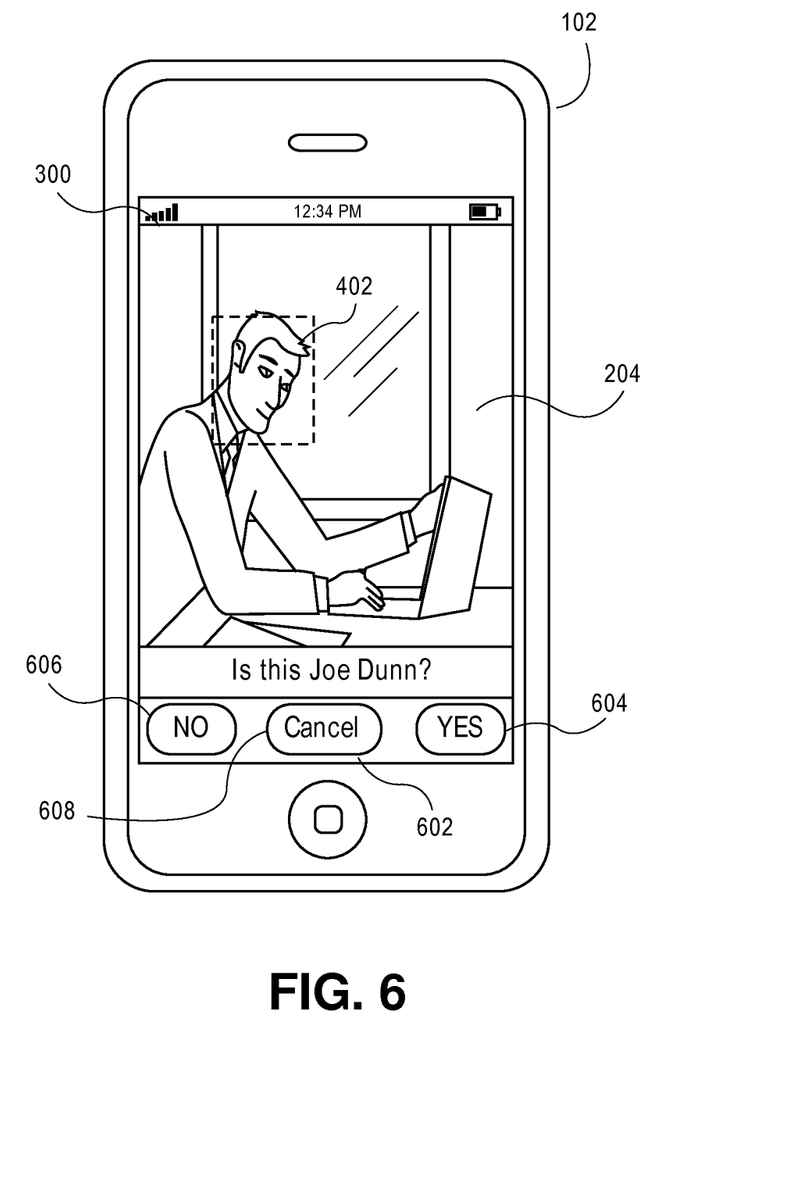
FIG. 6 is an example verification interface for verifying a matching contact, in accordance with an embodiment of the invention.

FIG. 6 shows an example verification interface 600 in which a user of the mobile device 102 may verify the accuracy of the matching contact found by operation 210 of the tagging application 200. In this example, the user is presented the image 204 from FIG. 4 along with identification information 602 of the matching contact which was found in operation 210 (e.g. contact 504(3)'s name "Joe Dunn"). If the user agrees that the face 402 in the image 204 has been properly identified at operation 210 as contact 504(3), the user may select virtual button 604 (i.e. "YES") represented on the touch screen 110 of the portable electronic device 102. Alternatively, if the user disagrees with the identification of the face 402 in the image 204, the user may select virtual button 606 (i.e. "NO") on the touch screen 110 of the portable electronic device 102 and then enter correct identification information for the face 402 in the image 204. The user also has the option of selecting virtual button 608 (i.e. "Cancel") to end the tagging process without tagging the image 204 with identification information of the face 402.

In yet another embodiment, operation 212 may verify the accuracy of the matching contact by comparing this result with a larger catalog of faces that are known to be properly identified. For example, operation 212 may verify the accuracy of the matching contact by comparing the matching contact and identification information with information stored by a digital photography application such as the iPhoto™ application; the latter may have been loaded and configured in the mobile device 100 by the user.

Image Tagging Phase

Following the positive verification of the match at operation 212, the tagging application 200 proceeds to the image tagging phase 201b where the image 204 may be tagged with identification information of a matching contact and prepared for transmission from the portable electronic device 102 to one or more recipient terminal's 104.

Referring to FIG. 2, the image tagging phase 201b of the tagging application 200 may begin at operation 214 by tagging the image 204 with identification information of a matching contact. In one embodiment, the image 204 is tagged by editing the metadata of an image or picture file 216, under which the image 204 will be stored and transferred. This results in a tagged image file 216. In other words, the identification information of the matching contact will be added into a metadata field of the file 216. In one embodiment, a name (either legal or an alias) of the matching contact identified at operation 210 and verified at operation 212 is inserted into the UserComment field of the metadata for the tagged image file 216. In this embodiment, the tagged image (or picture file 216) may be an Exif file.

Figure 7:
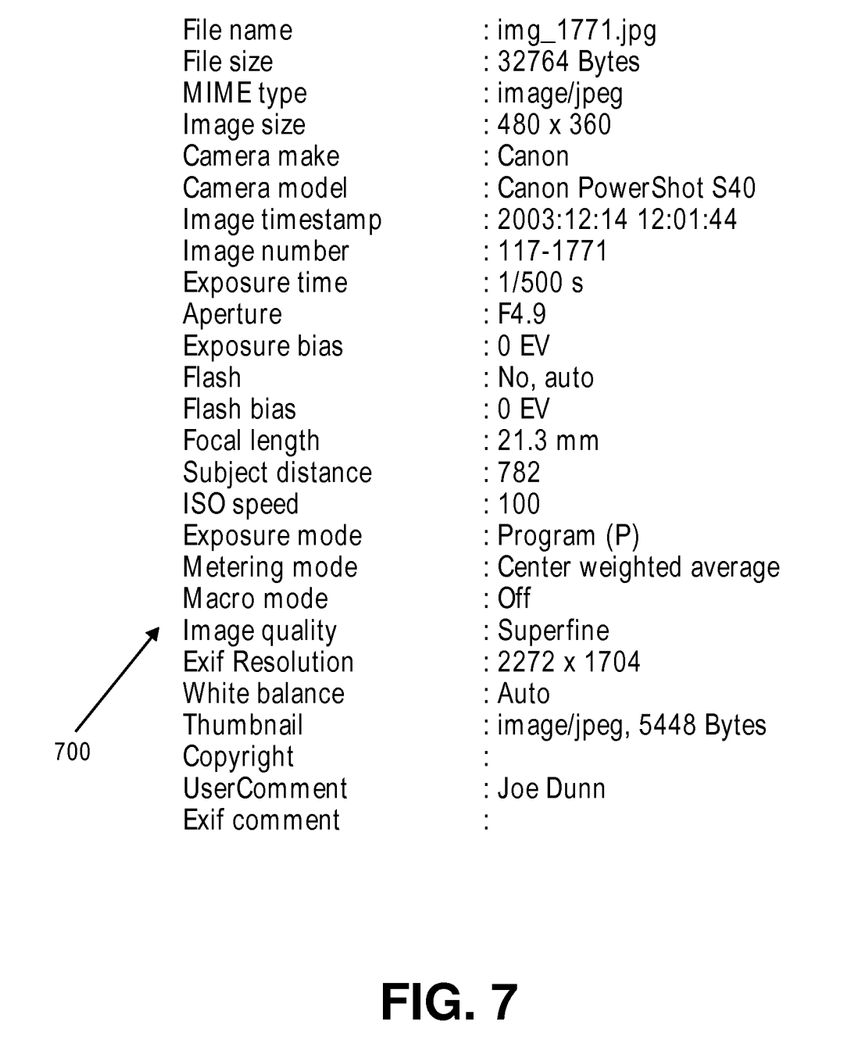
FIG. 7 shows example metadata of an image that has been tagged, in accordance with an embodiment of the invention.

FIG. 7 shows an example of how metadata 700 of the image 204 can be modified at operation 214 to include identification information of the contact 504(3) which was identified by operation 210 as the matching contact. Specifically, the UserComment field of the metadata 700 has been modified such that it includes the name of contact 504(3) (i.e. "Joe Dunn").

After the image 204 has been tagged with identification information of the matching contact, the tagged image file 216 is stored in a non-volatile memory of the mobile device 102.

Returning to FIG. 2, after the image 204 has been tagged with identification information of the matching contact to form the tagged image file 216, operation 218 prepares the tagged image file 216 to be sent to one or more recipient terminals 104 selected by the user. The user may be prompted to select the protocol with which the tagged image file will be sent to the recipient terminals (e.g. email, MMS) as well as the identity of the receipient terminal (e.g. a name selected from the user's contacts list; a manually entered email address or cellular telephone number.) The tagged image file 216 may be wrapped in a messaging protocol wrapper to form a multimedia message 220. The messaging protocol may be the Multimedia Message Format (MMS) protocol used by telecommunications carriers.

After being prepared for transmission, the multimedia message 220 is transmitted (in operation 222) over a network or direct connection to one or more recipient terminals 104 selected by the user. Transmission to recipient terminals 104 may require that the multimedia message 220 to be forwarded to one or more carrier store and forward servers (e.g. a MMSC server). The carrier store and forward servers may thereafter transmit the multimedia message 220 to the one or more recipient terminals 104 selected by the user through the Internet and/or other network infrastructure.

Figure 8:
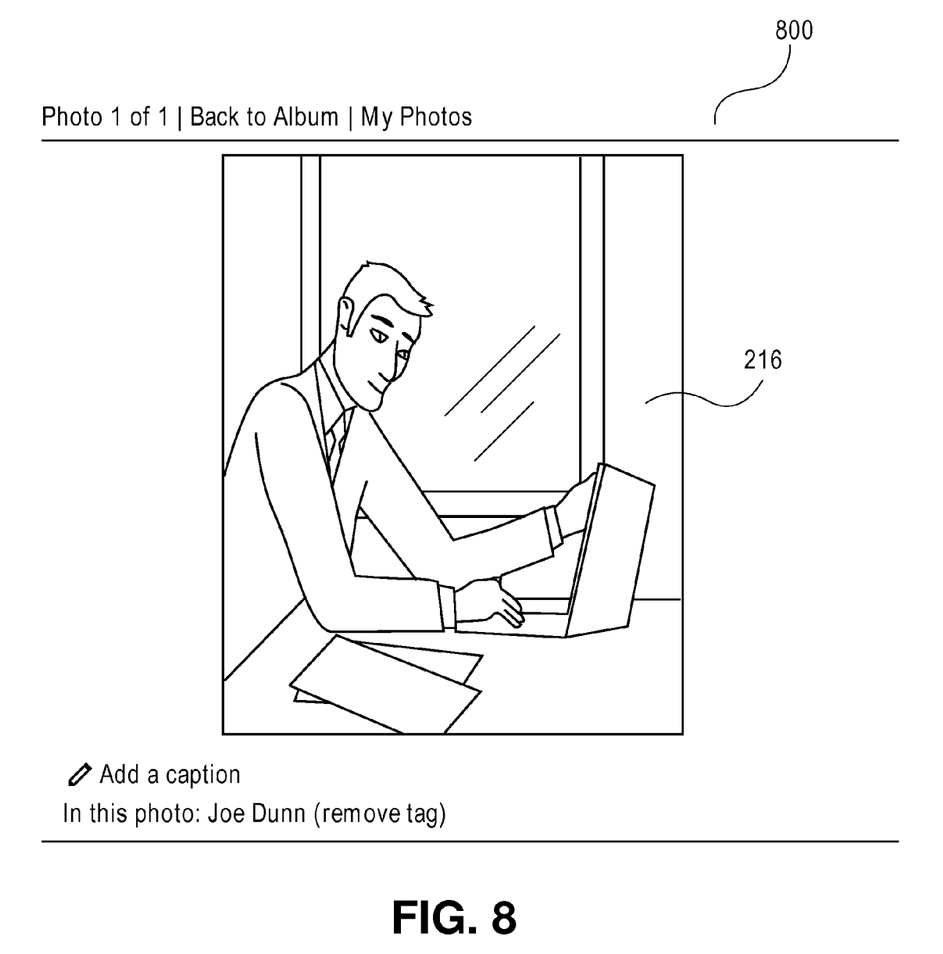
FIG. 8 is a screenshot of an image viewing application displaying a tagged image, in accordance with an embodiment of the invention.

Upon receipt, the recipient terminals 104 may unwrap the multimedia message 220 to expose the tagged image file 216 using a message application that is capable of decoding and reading messages transmitted in the messaging protocol originally used to wrap the tagged image file at operation 218. The tagged image file 216 may then be opened and decoded by an image viewing application. In one embodiment, the image viewing application is capable of reading and then showing the identification information that was incorporated into the tagged image file 216 by the tagging application. For example, the tagged image file 216 may be uploaded to a Facebook® account and viewed using the image viewing application incorporated into the Facebook® website as shown in FIG. 8. FIG. 8 shows the tagged image file 216. In this example, the identification information (i.e. "Joe Dunn") is listed below the image in the image viewing application 800.

Figure 9:
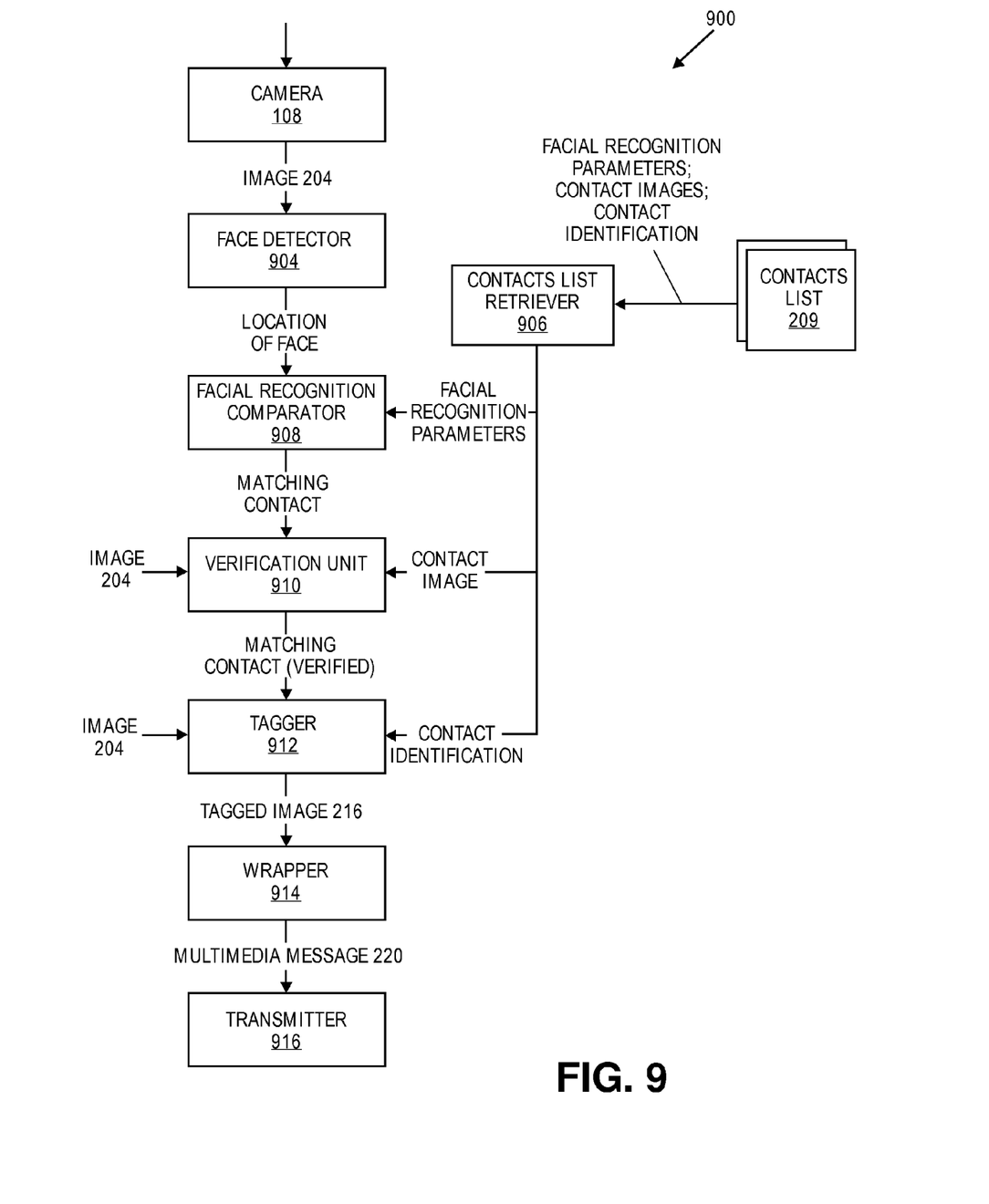
FIG. 9 is a system diagram of an image tagging system, in accordance with an embodiment of the invention.

FIG. 9 illustrates a system diagram for one embodiment of an image tagging system 900 which may operate in a mobile device 102. The components of the system 900 may be implemented as various combinations of mechanical and electrical elements that can be found in a typical mobile device, e.g. microelectronic digital camera module, camera lens system, specially programmed processors (programmed in accordance with the algorithm of FIG. 2), microelectronic memory (storage), and related interconnecting circuitry. In one embodiment, some or all of the algorithm operations of the image tagging application 200 described above in connection with FIG. 2 may be performed by the components of the image tagging system 900 as described below. Note that some or all of the components depicted in FIG. 9 may be implemented entirely as hardwired logic circuits, however for greater flexibility, a combination of hardwired logic circuitry and programmable logic or data processing components may be used instead.

The image tagging system 900 may commence operation automatically in response to the image 204 being captured by camera 108 which is integrated in the mobile device 102, or after being manually invoked to operate upon the image 204 which was previously captured. The camera 108 makes the image 204 available to the other system components of the image tagging system 900 through a push or pull data retrieval schema. In one embodiment, operation 202 of FIG. 2 may be performed by the camera 108.

A face detector 904 receives the image 204 from the camera 108 and scans the image to determine an area or areas of the image that contains a face. If the face detector 904 cannot find a face in the image 204, the image tagging system 900 may terminate without tagging the image 204. Conversely, if the face detector 904 does find a face in the image 204, the face detector 904 determines and outputs the location or area of the image 204 occupied by a face; it may also display the area to the user, on a display screen of the mobile device. In one embodiment, the face detector 904 outputs facial recognition parameters/signatures corresponding to the face in the image 204. In one embodiment, operation 206 of FIG. 2 may be performed by the face detector 904.

A contacts list retriever 906 retrieves the contacts list 209 which is stored in the portable electronic device 102 and makes the contacts list 209 available to the other system components of the image tagging system 900 through a push or pull data retrieval schema. In one embodiment, the contacts list retriever 906 retrieves facial recognition parameters/signatures corresponding to contact images in the contacts list. In one embodiment, operation 208 of FIG. 2 may be performed by the contacts list retriever 906.

The facial recognition comparator 908 receives/retrieves the location or area of the image 204 occupied by a face, the image 204, and the contact list 209. Thereafter, each contact image associated with contacts in the contacts list 209 is compared against the area of the image 204 occupied by a face to determine a matching contact. The matching contact is made available to the other system components of the image tagging system 900 through a push or pull data retrieval schema. In one embodiment, the facial recognition comparator 908 receives/retrieves facial recognition parameters/signatures corresponding to the face in the image 204 and compares these parameters/signatures against the facial recognition parameters/signatures corresponding to contact images in the contacts list 209. In one embodiment, operation 210 of FIG. 2 may be performed by the facial recognition comparator 908.

The verification unit 910 verifies the accuracy of the matching contact by requesting input from a user of the portable electronic device 102. The user may accordingly verify the accuracy or inaccuracy of the matching contact using an input device integrated or coupled to the portable electronic device 102. In one embodiment, operation 212 of FIG. 2 may be performed by the verification unit 910.

The tagger 912 receives/retrieves the image 204, the matching contact, and the contacts list 209 and tags the image 204 with identification information of a matching contact. In one embodiment, the image 204 is tagged by editing the metadata associated with the image 204, in a tagged image file 216 such that the metadata now includes identification information of the matching contact. The tagger 912 outputs the tagged image file 216 to the other system components of the image tagging system 900 through a push or pull data retrieval schema. In one embodiment, operation 214 of FIG. 2 may be performed by the tagger 912.

The wrapper 914 receives the tagged image from the tagger 912 and prepares the tagged image 216 to be sent to one or more recipient terminals 104 selected by the user. The tagged image 216 may be wrapped in a messaging protocol to form a multimedia message 220. The messaging protocol may be the Multimedia Message Format (MMS) protocol used by telecommunications carriers. In one embodiment, operation 218 of FIG. 2 may be performed by the wrapper 914.

The transmitter 916 receives the tagged image from the wrapper 914 and transmits the multimedia message 220 over the network 106 such that it may be received by one or more recipient terminals 104 selected by the user. In one embodiment, operation 222 of FIG. 2 may be performed by the transmitter 916.

As discussed above, the operations of image tagging system 900 may be allocated to the operations of FIG. 2. However, the distribution of operations to the image tagging system 900 may be different than the specific examples shown above. For instance, the operations of FIG. 2 may be distributed amongst a different set of components that make up the image tagging system 900.

To conclude, various aspects of a technique for tagging an image using a contacts list stored in a portable electronic device have been described. As explained above, an embodiment of the invention may be a machine-readable medium such as one or more solid sate memory devices having stored thereon instructions which program one or more data processing components (generically referred to here as "a processor" or a "computer system") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the tagged image or picture file 216, which contains the image 204, has been described in relation to a file containing Exif header components, the picture or image file may be in a different format. For example, the image 204 may be a frame in a video, such that the picture or image file 216 is actually a "video file" with a different header format than an Exif. The description is thus to be regarded as illustrative instead of limiting.

What is claimed is:

1. A computerized method for tagging images, the method comprising:
    capturing an image with a camera integrated in or coupled to a device;
    processing the image to designate an area in the image that contains a face;
    accessing a contact list;
    comparing the designated area with contact images in the contact list;
    selecting a contact image that includes the face based on results of the comparing;
    obtaining identification information for the face in the selected contact image, the identification information including a name of a person whose face is in the selected contact image;
    presenting the contact image and the obtained name on a display of the device;
    requesting user feedback to confirm that the obtained name identifies the face in the captured image;
    receiving the user feedback confirming that the obtained name identifies the face in the captured image; and tagging the image with the obtained identification information including the name in response to receiving the user feedback confirming that the obtained name identifies the face in the captured image.

2. The method of claim 1, further comprising:
wrapping the tagged image in a message transfer protocol to form a multimedia message; and
transmitting the multimedia message to an external device.

3. The method of claim 1, further comprising:
accessing a database of images separate from the contact list, wherein the database includes multiple pictures of an individual; and
verifying the determined identification information identifying the face in the designated area using the database of images.

4. The method of claim 1, wherein tagging the image with identification information comprises storing a name of the selected contact image in a metadata header of the image.

5. The method of claim 1, wherein comparing the designated area in the image with contact images is performed using facial recognition algorithms.

6. The method of claim 1, further comprising determining that the identification information is inaccurate, and requesting, through user feedback, correct identification information or input to cancel tagging the image.

7. The method of claim 1, further comprising:
detecting a plurality of faces in the image; and
prompting the user to select a face amongst a plurality of faces detected in the image; and
processing the image in the device to designate an area in the image that contains the selected face.

8. A non-transitory computer storage medium having stored instructions executable by a processor to:
process an image in accordance with a face recognition algorithm that can detect a face in the image,
compare the detected face to face signatures belonging to a plurality of contacts in a contacts list, and
in response to the comparison:
obtain identification information of a face included in one of the plurality of contacts, the identification information including a name of a person with the face,
present the name included in the identification information;
receive a verification, through user feedback, that the name identifies the face in the image, and
tag the image with the identified identification information of the one of the plurality of contacts in response to receiving the verification.

9. The non-transitory computer storage medium of claim 8, wherein the instructions are executable by the processor that program a mobile communications device to prompt a user for a shutter release command, to capture the image using a camera integrated in the mobile device and store the image in the mobile device.

10. The non-transitory computer storage of claim 8, wherein the instructions are executable by the processor to:
wrap the tagged image in a multimedia message transfer protocol to form a multimedia message; and
transmit the multimedia message to an external device.

11. The non-transitory computer storage of claim 8, wherein the instructions are executable by the processor to:
generate a face signature for a new contact image in the contacts list upon the new contact image being added to the contact list.

12. The non-transitory computer storage of claim 8, wherein the instructions are executable by the processor to tag the image with identification information by storing a name, of said one of the plurality of contacts.

13. The non-transitory computer storage of claim 8, wherein the instructions are executable by the processor to receive input that the identified identification information does not apply to the face in the image, and to prompt the user to enter correct information in response to receiving the input that the identified identification information does not apply to the face in the image.

14. A system comprising:
a face detector to process an image in a device in accordance with a face recognition algorithm that can detect a face in the image,
a contacts list retriever to access a contact list,
a comparator to compare the face in the image with a plurality of faces obtained from accessing the contact list stored in the device, to determine a matching face to the face in the image,
a verifier to present the matching face and a name of a person with the matching face and to receive a verification, through user feedback, that the name identifies the determined matching face, and
a tagger to tag the image with identification information of the matching face in response to receiving the verification.

15. The system of claim 14, further comprising:
a wrapper to wrap the tagged image in a message transfer protocol to form a multimedia message; and
a transmitter to transmit the multimedia message to an external device.

16. The system of claim 14, further comprising:
a database retriever to access a database of images separate from the contact list, wherein the database includes multiple pictures of an individual; and
a validator to verify the determined identify of the face in the image using the database of images.

17. The system of claim 14, wherein tagging the image with identification information comprises storing a name associated with the matching face in the metadata header of the image.

18. The system of claim 14, wherein comparing the face in the image with the plurality of faces is performed using facial recognition algorithms.

19. The system of claim 14, wherein upon indicating that the identification information is inaccurate, the user is prompted to enter correct identification information.

20. A system, comprising:
a processor; and
a computer storage medium storing instructions executable by the processor to perform operations comprising:
capturing an image;
processing the image to designate an area in the image that contains a face;
retrieving a contact list;
comparing the designated area in the image with face signatures of the user's contacts obtained from retrieving the contact list to identify a matching contact included in the contact list;
in response to the comparing:
obtaining, from the contact list, identification information of the matching contact, the identification information including a name,
presenting the name,
receiving verification, through user feedback, that the name identifies the face in the designated area, and tagging the image with identification information of a matching face signature in response receiving the verification.

21. The system of claim 20, the operations further comprising:

wrapping the tagged image in a message transfer protocol to form a multimedia message; and transmitting the multimedia message to an external device.

22. The system of claim 20, wherein tagging the image with identification information comprises storing a name associated with the matching contact image in the metadata header of the image to form the tagged image.

23. The method of claim 1, wherein the face is a first face, the contact image is a first contact image, and the identification information is the first identification information, and wherein the method further comprises:

processing the image to designate an area in the image that contains a second face;

selecting a second contact image that includes the second face in response to comparing the designated area in the image that contains the second face with contact images in the contact list;

obtaining second identification information for the face in the second contact image;

presenting the second contact image and the second identification information on a display of the device;

requesting user feedback to confirm that the second identification information identifies the second face in the second contact image;

receiving the user feedback that the second identification information does not identify the second face in the second contact image; and requesting, through user feedback, correct second identification information or input to cancel tagging the second contact image in response to receiving the user feedback that the second identification information does not identify the second face in the second contact image.

* * * * *

UNITED STATES PATENT AND TRADEMARK OFFICE
CERTIFICATE OF CORRECTION

PATENT NO. : 8,810,684 B2  
APPLICATION NO. : 12/757653  
DATED : August 19, 2014  
INVENTOR(S) : Chang Page 1 of 1

It is certified that error appears in the above-identified patent and that said Letters Patent is hereby corrected as shown below:

In the Claims

Column 11, Line 56, Claim 10, delete "storage of" and insert -- storage medium of --, therefor.

Column 11, Line 61, Claim 11, delete "storage of" and insert -- storage medium of --, therefor.

Column 11, Line 66, Claim 12, delete "storage of" and insert -- storage medium of --, therefor.

Column 12, Line 3, Claim 13, delete "storage of" and insert -- storage medium of --, therefor.

Column 13, Line 2, Claim 20, delete "response receiving" and insert -- response to receiving --, therefor.

Signed and Sealed this
Third Day of February, 2015

Michelle K. Lee
*Deputy Director of the United States Patent and Trademark Office*